United States Patent [19]
Carlisle et al.

[11] Patent Number: 5,810,534
[45] Date of Patent: Sep. 22, 1998

[54] CLEATED NAIL HAVING ENLARGED DIAMETER SHANK PORTION

[75] Inventors: Robert S. Carlisle, Maysville, Ky.; James P. Elliott, Cincinnati; Roger Blair, Bethel, both of Ohio

[73] Assignee: Senco Products, Inc., Cincinnati, Ohio

[21] Appl. No.: 800,692

[22] Filed: Feb. 14, 1997

[51] Int. Cl.⁶ ................................................. F16B 15/08
[52] U.S. Cl. ................................................ 411/455; 411/922
[58] Field of Search ........................... 411/455, 451, 411/490, 487, 922

[56] References Cited

U.S. PATENT DOCUMENTS

| | | | |
|---|---|---|---|
| 364,439 | 6/1887 | Rogers | 411/455 |
| 2,025,961 | 12/1935 | Stone | 411/455 |
| 2,172,553 | 9/1939 | Tripp | 411/455 |
| 3,717,067 | 2/1973 | Vick | 411/455 |
| 5,391,029 | 2/1995 | Fardell | 411/455 |
| 5,489,179 | 2/1996 | Gabriel | 411/922 |

*Primary Examiner*—Flemming Saether
*Attorney, Agent, or Firm*—Jerrold J. Litzinger

[57] ABSTRACT

This invention relates to a nail having a head and an elongated shank with two deformed or cleated portions along the axis of the shank to increase the holding properties of the nail, especially when used to secure sheathing material to floor joists, roof trusses, or wall studs. The increased holding property is largely attributed to the second cleated portion having a diameter of about 2–25% larger than the first cleated portion of the shank.

5 Claims, 2 Drawing Sheets

CLEATED NAIL HAVING ENLARGED DIAMETER SHANK PORTION

BACKGROUND OF THE INVENTION

This invention relates broadly to a metal fastening device with a deformed surface to enhance its holding and retaining properties when used to fasten pieces of material, usually wood, together during a variety of construction and assembly procedures. The fastening devices, or nails, envisioned by the present disclosure are the products of many years of research and technology, and while designed to perform all of the traditional functions generally required of nails, they are ideally suited to be pneumatically driven into sheathing material such as sheets and boards which are, in turn, ultimately attached to joists, trusses, or studs.

While there is certainly little novelty in the concept of a cleated nail, there is a continuing need to develop improved cleated fastening devices.

DESCRIPTION OF THE PRIOR ART

A review of the patent art is useful to set the stage for the full exemplification of the disclosed device and to demonstrate how subtle variations of a basic theme provide for the evolution of a continuously improved and unique product.

U.S. Pat. No. 356,549 to Raymond dated Jan. 25, 1887, describes a heel nail with a cylindrical shank having downward pointed serrations or cleats to prevent the inward movement of the nail into the heel of the foot.

G.B. Patent Specification 873,960 to Cooper dated August 1961, gratuitously discloses a panel pin, or nail, having a shank that is annulated to form frusto-conical rings with points, acting as cleats, directed axially toward the head of the pin.

U.S. Pat. No. 3,120,148 to Prutton dated Feb. 4, 1964, discloses a nail having a shank that is annulated to form frusto-conical rings with points, acting as cleats, directed axially toward the head of the nail and contiguous frusto-conical rings having points directed axially toward the pointed end of the nail.

U.S. Pat. No. 4,932,820 to Schniedermeier dated Jun. 12, 1990, discloses a scaffolding nail having a shank with a cleated portion separating two uncleated portions. The cleats can be formed from a plurality of annular rings which may be frusto-conical and which may have points directed in either direction along the axis of the shank.

SUMMARY OF THE INVENTION

Notwithstanding the prior teachings of the patent art, there remains a need for a cleated fastening device having properties and features unlike those taught or suggested by earlier disclosures. Accordingly then, it is in response to such a need that the presently disclosed nail was designed and developed. More specifically, in response to the needs and demands of the construction industry, a nail having a head and a shank, said shank defining an axis with a pointed end and having a first cleated portion extending axially from said pointed end and terminating in an uncleated portion. This uncleated portion, extending axially to a second cleated portion, allows for differences in axial elongation due to the process of creating the cleated portions of the shank. Said second cleated portion having a diameter of about 2–25% larger than the diameter of said first cleated portion, and axially extending from said uncleated portion to the vicinity of the head.

DESCRIPTION OF THE PREFERRED EMBODIMENTS

The metal fastening device of this disclosure is essentially a cleated nail designed primarily to secure sheathing material, either sheets or boards, to joists, trusses, or studs in such a manner that there is a reduced likelihood that the nails will "work loose", pop up and cause damage or injury. The further advantage of this fastening device is that it will achieve this holding advantage in the sheathing alone, even when the joist, truss, or stud is missed by the nail. This enhanced holding property is achieved by providing the shank of the nail with two cleated portions and where the second cleated portion has a larger diameter than the first cleated portion.

Figure 1:
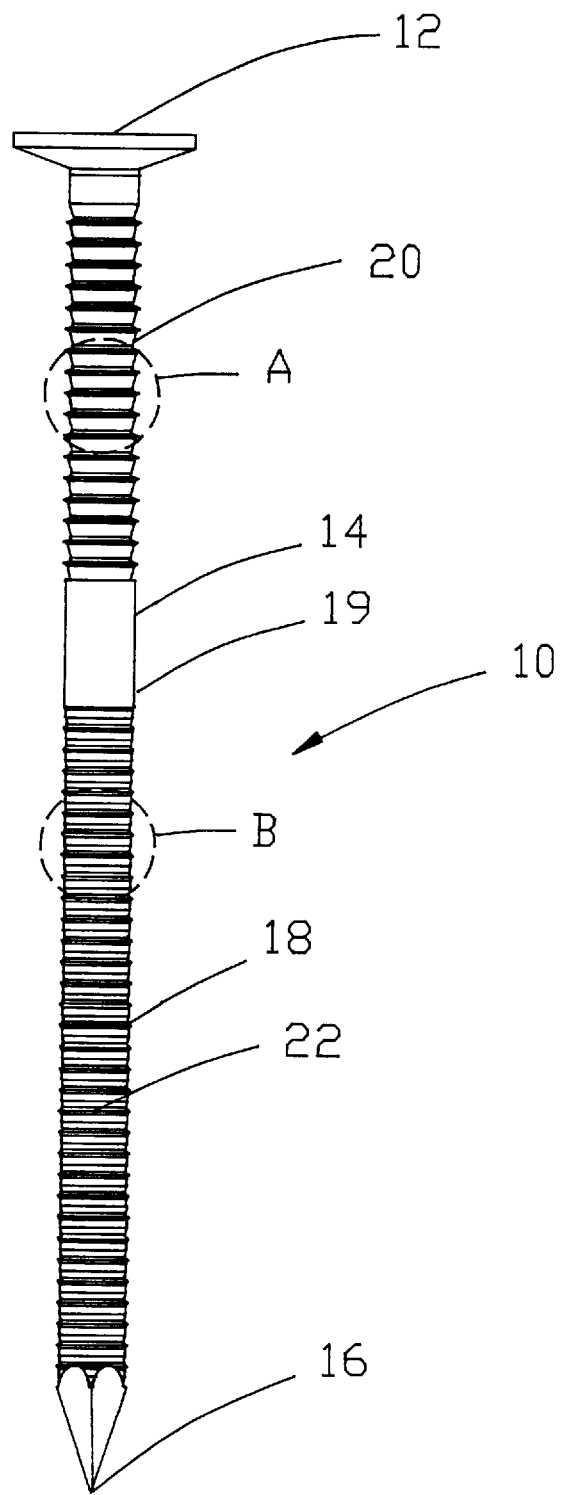
FIG. 1 is a perspective view of the cleated nail on an enlarged scale.

Reference to the drawings should be made to facilitate the description of a preferred embodiment of the disclosed nail. In FIG. 1, it is readily apparent that the nail 10 has a head 12 attached to a shank 14 which is generally cylindrical in shape. The head can be fashioned into a variety of sizes and shapes without detracting or deviating from the desirable properties provided by the cleat arrangement offered as an improvement over the prior art. If head 12 is considered to be the origin of the nail 10, the point 16 should be considered to be the terminus of the nail. The shape or design of the point 16 is not essential to the touted design features of the disclosed nail. However, it is essential that the point be capable of penetrating the work piece. Over the years, it has been observed that a variety of designs and configurations will serve a penetrating function with equal, or at least suitable, distinction. Common point designs will include both rounded and faceted convergence.

Between the origin of the nail at the head 12 and the terminus of the nail at the point 16 is the shank 14, which can best be characterized as defining an axis. Beginning in the vicinity of the point 16 of the nail and extending axially along the length of the shaft is a first cleated portion 18. This first cleated portion 18 extends axially along the shank 14 for a variable distance, which will depend upon the overall length of the nail, which will, in turn, depend upon the use of the nail, until it terminates in an uncleated portion 19. And to reiterate somewhat, the uncleated portion allows for differences in axial elongation especially when the process of creating the cleated portions of the shank involves annulating with a cutting die.

Figure 2:
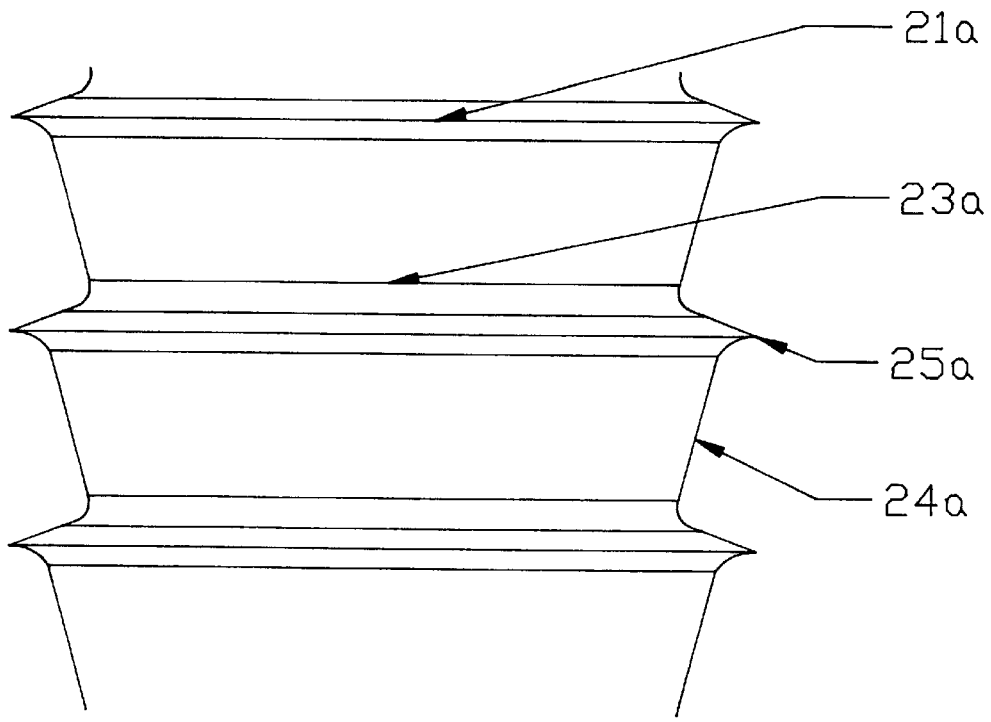
FIG. 2 is a further enlarged perspective view of the A area from FIG. 1.
Figure 3:
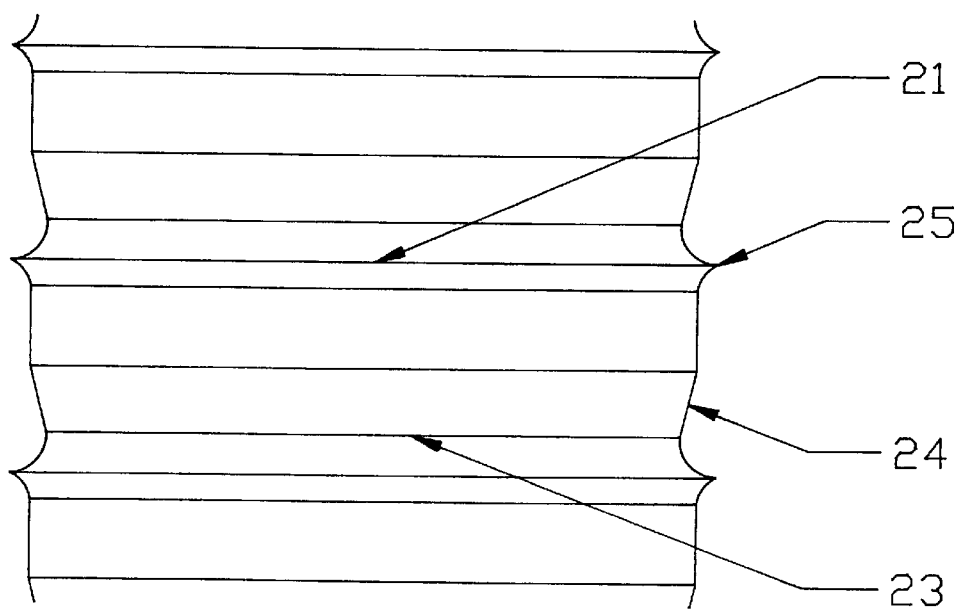
FIG. 3 is a further enlarged perspective view of the B area from FIG. 1.

While it is axiomatic that shank diameter, sheathing thickness and ring size, if the cleats are annular, are the primary variables that will determine the relative lengths of the cleated and uncleated portions. The use or purpose of the nail is the primary variable that will determine the overall length of the nail, In a generally preferred embodiment of this cleated nail, the uncleated portion 19 extends axially along the length of the shaft, for a distance of about 0.180–0.210 inches, until it terminates in a second cleated portion 20 which extends axially along the length for a variable distance of about 0.438 to 1.156 inches of the shaft 14 until it terminates in the vicinity, or more precisely, at a point approximately 0.100 inches below the point of tangency between the head 12 and the shank 14. As a practical matter, it is unlikely, and in fact unwise, for the cleating to extend to the head 12 because any disruption in the surface of the shank at the point of attachment to the head would weaken this interface and jeopardize the integrity of the nail. These cleated portions 18 and 20, can be fashioned in several different ways. In the preferred embodiment exemplified herein, the cleats are essentially annulations tooled into the shaft 14 of the nail 10. If, as herein depicted, the annulations are of different sizes or diameters, a design can be tooled into the shaft of the nail 10. A design having a particularly beneficial function is a frusto-conical design formed by alternately annulating the shaft 14 with rings of two different diameters. As depicted in FIGS. 2 and 3, the tips of the larger annulations 21 and 21a will form points 25 and 25a supported by the frusto-conical sides 24 and 24a which originate in the smaller annulations 23 and 23a.

Again, in the preferred embodiment depicted herein, it should be noted that the smaller annulations 23 and 23a and larger annulations 21 and 21a are paired so that the larger annulations form points 25 and 25a that are directed axially toward the head 12 of the nail 10. Such an orientation of points 25 and 25a will enhance the holding properties of the nail and discourage a tendency of the nail to protrude through the sheathing material if, perchance, it works loose from pressures or vibrations, regardless of whether or not the nail is imbedded in a joist, truss or stud.

To further increase the ability of a cleated nail fashioned according to this disclosure to remain embedded in the work piece, the second cleated portion is drawn and tooled to provide an enlarged diameter. This enlargement will typically be about 2–25% larger than the diameter of the first cleated portion of the shank. By limiting or confining the enlarged diameter to the second cleated portion, the nail has a greater inclination to remain secure in the sheathing, regardless of whether the nail has penetrated a joist, truss, or stud. Because the diameter for the first cleated portion is smaller, less work piece is displaced when driving the nail. With less work piece displaced, there is less stress on the work piece and there is therefore a greater tendency for the nail to remain in place. Couple this fact of material science and physics with the larger cleats in the second cleated portion, which are positioned to remain primarily in the sheathing material, and any tendency for the nail to work loose and pop through the surface of the sheathing material is virtually eliminated.

While the foregoing is a detailed and comprehensive description of a cleated nail having an enlarged cleated diameter portion, it should be apparent that numerous variations and modifications may also be employed to implement the spirit and purpose of this invention. And, therefore, this elaboration should not be assumed to limit the scope of the invention which is defined by the appended claims.

What is claimed is:

1. A nail, comprising:
    a head;
    an elongate shank defining an axis having the head at one end and terminating at the other end in a point, said shank having a first cleated portion extending axially from said pointed end toward said head consisting of a plurality of first continuous annulations, each of which terminates in a gripping point, whereby each of said first annulations is separated by a plurality of second continuous annulations, each of which having a diameter smaller than the adjacent first annulations, and a second cleated portion extending axially between said first cleated portion and said head consisting of a plurality of third continuous annulations, each of which terminates in a gripping point, whereby each of said third annulations is separated by a plurality of fourth continuous annulations, each of which having a diameter smaller than the adjacent third annulations, with said first and second cleated portions separated by a first smooth shank portion and said third annulations having a larger diameter than said first annulations.

2. The nail of claim 1, wherein the diameter of said third annulations is about 2 to 25% larger than the diameter of said first annulations.

3. The nail of claim 1, further including a second smooth shank portion which separates said second cleated portion and said head.

4. The nail of claim 1, wherein the diameter of said head is greater than the diameter of said third annulations.

5. The nail of claim 1, whereby the shank portion between each third annulation and each fourth annulation is of a frusto-conical shape which tapers in the direction of said pointed end.

* * * * *